United States Patent
Liang

(10) Patent No.: US 11,747,923 B2
(45) Date of Patent: Sep. 5, 2023

(54) FLEXIBLE WIRELESS CHARGING MOUSE PAD

(71) Applicant: YUHONG ELECTRONIC (SHENZHEN) CO., LTD., Guangdong (CN)

(72) Inventor: Wei-Jen Liang, New Taipei (TW)

(73) Assignee: YUHONG ELECTRONIC (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/364,488

(22) Filed: Jun. 30, 2021

(65) Prior Publication Data

US 2023/0004238 A1 Jan. 5, 2023

(51) Int. Cl.
*H02J 50/00* (2016.01)
*G06F 3/039* (2013.01)
*H02J 50/12* (2016.01)

(52) U.S. Cl.
CPC .......... *G06F 3/0395* (2013.01); *H02J 50/005* (2020.01); *H02J 50/12* (2016.02); *H02J 50/00* (2016.02); *H02J 2310/22* (2020.01)

(58) Field of Classification Search
None
See application file for complete search history.

(56) References Cited

U.S. PATENT DOCUMENTS

| 5,968,644 A * | 10/1999 | Lai | B32B 5/24 |
| | | | 428/317.1 |
| 6,852,170 B1 * | 2/2005 | Williams | G06F 3/0395 |
| | | | 134/42 |
| 2005/0275629 A1 * | 12/2005 | Chin | G06F 3/03543 |
| | | | 345/163 |
| 2020/0218370 A1 * | 7/2020 | Lu | H01F 38/14 |

FOREIGN PATENT DOCUMENTS

CN 208044561 U * 11/2018 ............. G06F 3/039

* cited by examiner

*Primary Examiner* — Xuyang Xia
(74) *Attorney, Agent, or Firm* — Chun-Ming Shih; HDLS IPR SERVICES

(57) ABSTRACT

A flexible wireless charging mouse pad includes an anti-slip cushion layer, a double-sided adhesive layer, and a coil. The anti-slip cushion layer has a topside with a single-ring groove, and the single-ring groove has an inner bottom groove wall. The double-sided adhesive layer is adhered to the topside. The coil has multiple surrounding rings arranged side by side with one another to form a coil module, and the coil module of the coil inside the single-ring groove is stacked and connected between the double-sided adhesive layer and the inner bottom groove wall and adhered by the double-sided adhesive layer, so as to achieve a wireless charging effect by the mouse pad in the condition of having only one single-ring groove on the flexible board layer, further to achieve the effects of reducing manufacturing difficulty, lowering manufacturing cost, and improving market competitiveness.

9 Claims, 3 Drawing Sheets

FLEXIBLE WIRELESS CHARGING MOUSE PAD

BACKGROUND OF THE DISCLOSURE

Technical Field

The technical field of this disclosure relates to a mouse pad, and more particularly to a flexible wireless charging mouse pad.

Description of Related Art

With the rise of various wireless electronic products, people become accustomed to the use of electronic products wirelessly, and the related art of charging an electronic product by connecting a cable to the electronic product is gradually replaced by wireless charging in recent years. Users simply need to place an electronic product with a receiving coil on a wireless charger with a transmitting coil for wireless charging without requiring any cable connection. Charging can be performed anytime and anywhere, which is very convenient.

In the wireless charging technology, magnetic resonance is used to achieve the effect of wireless charging. A magnetic resonance type wireless charging uses resonant devices (including inductors and capacitors) to drive a transmitting end and a receiving end to reach a specific frequency, so as to generate magnetic field resonance and energy.

Although the magnetic resonance type wireless charging has the advantage of high transmission efficiency and becomes a focus of the development of the related industry, surrounding rings of a coil cannot be arranged side by side with one another when the magnetic resonance principle is used to achieve the wireless charging effect, and the substrate for accommodating the coil must requires a plurality of grooves for the surrounding rings. Moreover, the process of forming many grooves on the same substrate has certain technical issues, and it is necessary to overcome a large barrier to integrate the wireless charging function into a mouse pad because the process of forming many grooves on the same substrate is very difficult.

SUMMARY OF THE DISCLOSURE

Therefore, it is a primary objective to provide a flexible wireless charging mouse pad that adopts the principle of electromagnetic induction together with a coil module formed by arranging a plurality of surrounding rings side by side with one another to overcome the technical issue of forming many grooves on the same flexible board layer of the related-art wireless charging mouse pad and this disclosure only requires to set or form one single-ring groove on the flexible board layer.

To achieve the aforementioned and other objectives, this disclosure discloses a flexible wireless charging mouse pad, including; an anti-slip cushion layer with a topside and having a single-ring groove concavely formed on the topside in a longitudinal direction, and an inner bottom groove wall formed on a concave end point of the single-ring groove; a double-sided adhesive layer, attached and adhered to the topside; and a coil, having a plurality of surrounding rings arranged side by side with one another in a lateral direction, and each of the surrounding rings of the coil in the single-ring groove being stacked and coupled between the double-sided adhesive layer and the inner bottom groove wall in the longitudinal direction and adhered by the double-sided adhesive layer.

Compared with the related art, this disclosure has the following effect. Only one single-ring groove is set or formed on the flexible board layer to achieve the wireless charging of a mouse by the mouse pad. This disclosure has the advantages of reducing manufacturing difficulty, lowering manufacturing cost, and improving market competitiveness.

DESCRIPTION OF THE EMBODIMENTS

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
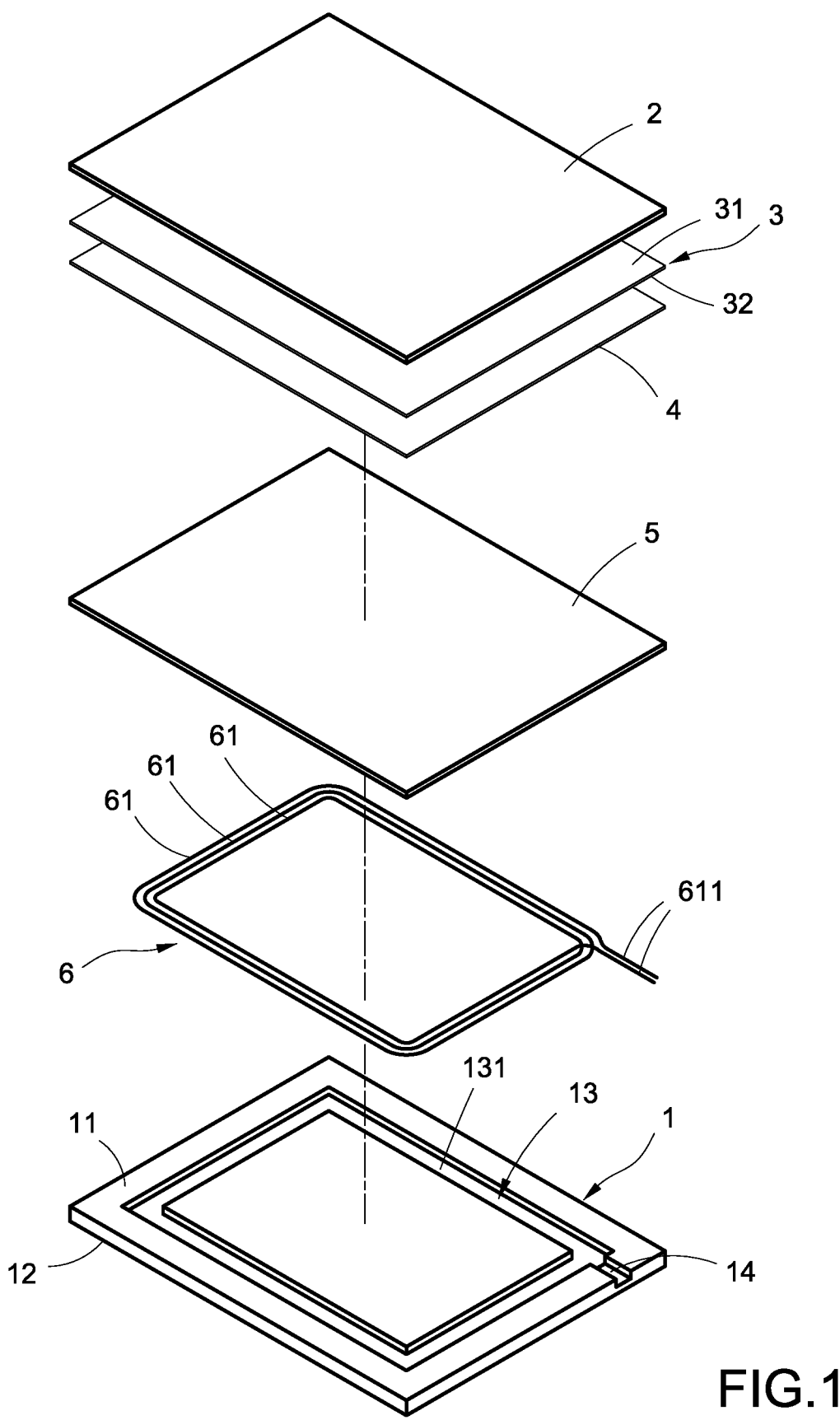
FIG. 1 is an exploded view of a mouse pad of this disclosure, viewing from the bottom.
Figure 2:
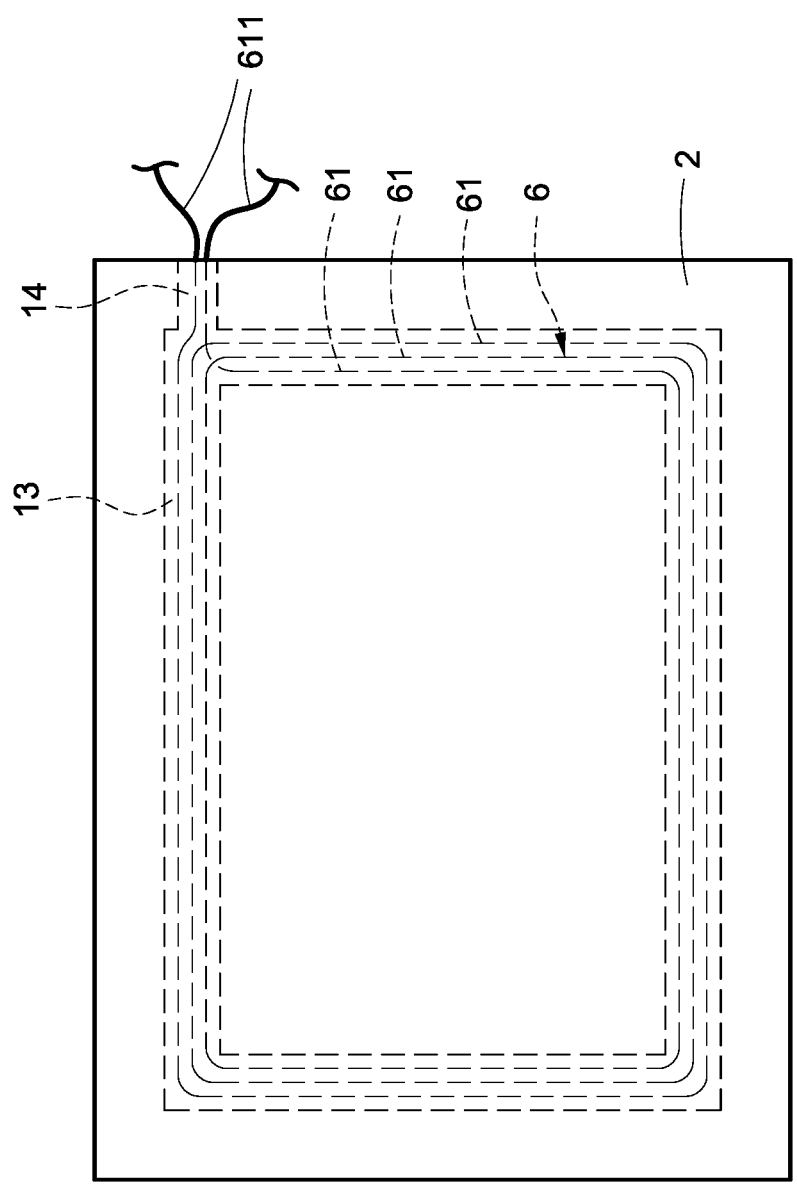
FIG. 2 is a schematic view of an assembled mouse pad of this disclosure mouse pad, viewing from the top.
Figure 3:
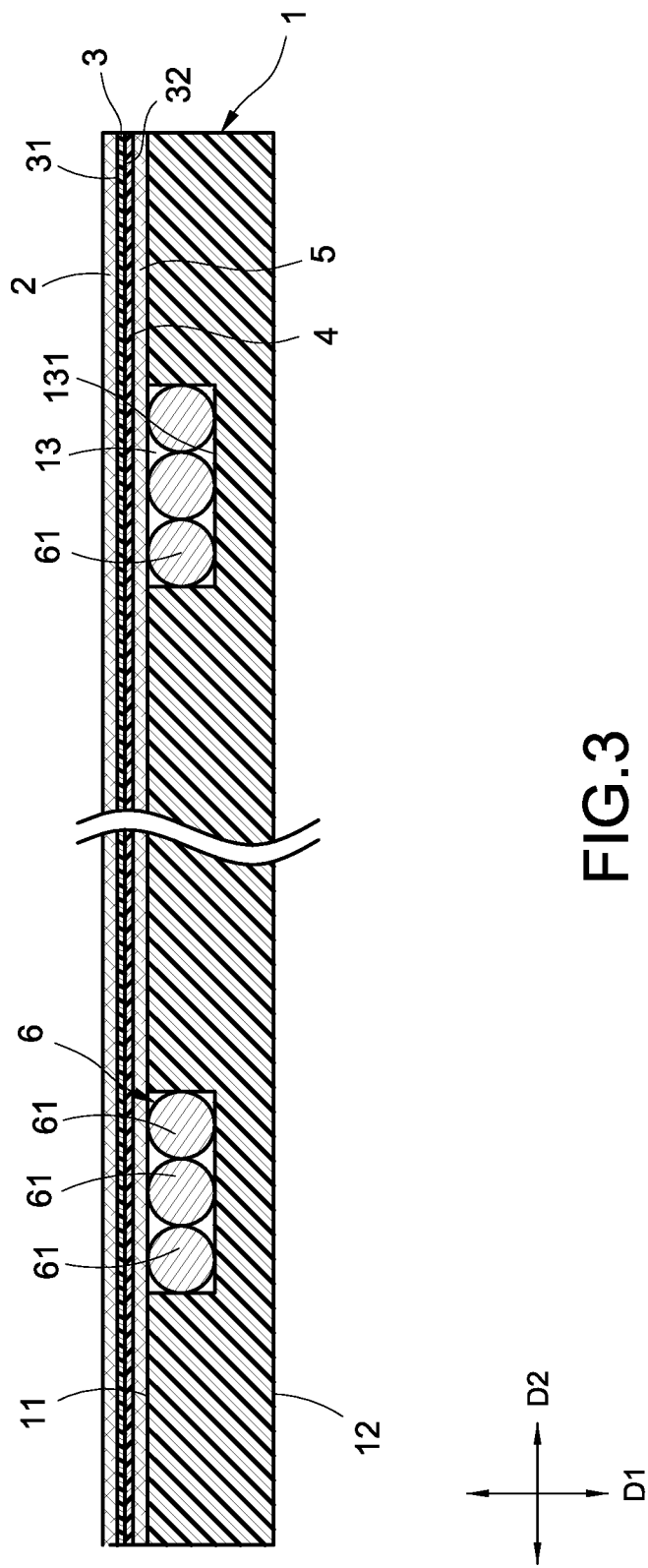
FIG. 3 is a cross-sectional view of an assembled mouse pad of this disclosure.

With reference to FIGS. 1 to 3 for a flexible wireless charging mouse pad of this disclosure (hereinafter referred to as the "mouse pad"), the mouse pad is a flexible mouse pad with a wireless charging function. The mouse pad of this disclosure includes an anti-slip cushion layer 1, a double-sided adhesive layer 5, and a coil 6. In some embodiments, the mouse pad further includes a contact layer 2, a plastic sheet layer 3, and a cloth layer 4 as described below.

The anti-slip cushion layer 1 may be any soft (flexible) anti-slip pad, as long as it is a soft (flexible) pad with an anti-slip effect and capable of setting or forming a groove as described below. In this embodiment, the anti-slip cushion layer 1 may be a rubber anti-slip pad or a silicone anti-slip pad, but this disclosure is not limited to such arrangement only. The anti-slip cushion layer 1 has a topside 11 and an underside 12 opposite to each other, and only one single-ring groove 13 is set or formed on the topside 11 of the anti-slip cushion layer 1. In some embodiments, a communicating slot 14 is set or formed and the communicating slot 14 communicates between the single-ring groove 13 and the outside. In FIG. 3, the anti-slip cushion layer 1 has a length and a width extending along respectively a lateral direction D2 and the other lateral direction (not labeled and perpendicular to D2 and D1), and a thickness extending along a longitudinal direction D1, so that the aforementioned single-ring groove 13 is concavely formed on the topside 11 along the longitudinal direction D1, and an inner bottom groove wall 131 is formed on a concave end point.

The single-ring groove 13 may be set or formed openly, that is, the required single-ring groove 13 may be directly formed on the underside 12. In other words, the single-ring groove 13 is directly evacuated from the underside 13. The aforementioned method may be in a stacking form in which the anti-slip cushion layer is stacked and combined to form the required single-ring groove 13. For example, two bottom plates are stacked under a large top plate, and the two bottom plates are separated from each other, so that the required single-ring groove 13 is formed between the top plate and the two bottom plates. In other words, the single-ring groove 13 is sunken into the underside 12.

The double-sided adhesive layer 5 is a one-piece form of double-sided adhesive tape having an area corresponding to the area of the anti-slip cushion layer 1, but this disclosure is not limited to this arrangement, and the area of the double-sided adhesive layer 5 may also be slightly greater than or smaller than the area of the anti-slip cushion layer 1 (not shown in the figure). The double-sided adhesive layer 5 has a side attached or adhered to the topside 11 of the anti-slip cushion layer 1 and the other side adhered and fixed to the contact layer 2.

The coil 6 has a plurality of surrounding rings 61. In particular, the surrounding rings 61 are arranged side by side with one another to form a coil module (which is not labeled with a numeral and is formed by connecting a plurality of wires (or the surrounding rings 61)) side by side with one another along the lateral direction D2, and the coil module is installed into the single-ring groove 13 along the longitudinal direction D1 and stacked and coupled between a side of the double-sided adhesive plate 5 and the inner bottom groove wall 131 along the longitudinal direction D1, and the coil module is adhered by the double-sided adhesive plate 5. It is noteworthy that the coil 6 may be used to adhere the coil module with a side of the double-sided adhesive layer 5 first, and then the side of the double-sided adhesive layer 5 is attached and adhered to the topside 11 of the anti-slip cushion layer 1, while the coil module of the coil 6 is set and fixed into the single-ring groove 13 along the longitudinal direction D1 correspondingly. The coil 6 may also be used to set the coil module into the single-ring groove 13 along the longitudinal direction D1, and then a side of the double-sided adhesive layer 5 is attached and adhered to the topside 11 of the anti-slip cushion layer 1 while the coil module of the coil 6 is adhered by a side of the double-sided adhesive layer 5 and fixed into the single-ring groove 13.

Both the head and tail of the coil 6 are arranged to form an overhang 611 (as shown in FIG. 1), and the overhang 611 is disposed in the communicating slot 14, so that the coil 6 may be connected to an external power supply through the overhang 611.

Although the other side of the double-sided adhesive layer 5 has a little effect of contacting the mouse for use, the mouse pad of this disclosure further includes a contact layer 3 stacked and coupled the other side of the double-sided adhesive layer 5 along the longitudinal direction D1 and adhered and fixed by the double-sided adhesive layer 5 to further improve the contact effect. The contact layer 3 may be a piece of cloth, a film or a plastic sheet.

After the mouse pad of the disclosure is electrically connected to a power, a user may put a mouse (not shown in the figures) with the wireless charging function in a corresponding position on the other side of the double-sided adhesive layer 5 or on the contact layer to charge the mouse on the mouse pad by the principle of electromagnetic induction. Since the anti-slip cushion layer 1 only has one single-ring groove 13, therefore this disclosure may overcome the difficulty of forming a number of grooves in the same flexible board layer 1 of related art, and has the effects of reducing the manufacturing difficulty, lowering the manufacturing cost, and improving the market competitiveness. In addition, the anti-slip cushion layer 1 acts as the anti-slip pad at the same time as well as a substrate used for setting or forming the single-ring groove 13 to achieve the effect of saving the material cost.

The mouse pad of this disclosure further includes a plastic sheet layer 3 stacked and coupled between the contact layer 2 and the other side of the double-sided adhesive layer 5 along the longitudinal direction D1. The plastic sheet layer 3 may be a rubber sheet or a sheet made of a material similar to plastics, and the plastic sheet layer 3 has a topside 31 and an underside 32 opposite to each other, and the contact layer 2 is stacked and fixed to the topside 31 of the plastic sheet layer 3.

In some embodiments, the mouse pad of this disclosure further includes a cloth layer 4 stacked and coupled between the underside 32 of the plastic sheet layer 3 and the other side of the double-sided adhesive layer 5 in the longitudinal direction D1. In addition to the cloth layer 4 being adhered and fixed by the other side of the double-sided adhesive layer 5, the plastic sheet layer 3 and the cloth layer 4 may also be engaged with each other by hot pressing. The cloth layer 4 is a non-woven fabric or any other fabric capable of engaging with the plastic sheet layer 3 by hot pressing. Therefore, the coil module of the coil 6 may be stacked and coupled between the inner bottom groove wall 131 and a side of the double-sided adhesive layer 5 inside the single-ring groove 13 as shown in FIG. 3. In other words, the contact layer 2, the plastic sheet layer 3, the cloth layer 4, the double-sided adhesive layer 5, the coil module of the coil 6 and the inner bottom groove wall 131 are stacked on top of one another along the longitudinal direction D1.

In addition, the surrounding rings 61 used to form the aforementioned coil module are partly coplanar with the topside 11. In other words, the topsides of the surrounding rings 61 are coplanar with the topside 11 of the anti-slip cushion layer 1 as shown in FIG. 3 in order to prevent the double-sided adhesive layer 5 or contact layer 2 from being uneven when the mouse pad is in use.

It is noteworthy that the contact layer 2 and the plastic sheet layer 3 may be fixed by adhesion or any other fixation method, which is not limited by this disclosure.

In summation of the description above, the flexible wireless charging mouse pad of this disclosure surely achieves the expected objective of use, overcomes the drawbacks of the related art.

While this disclosure has been described by means of specific embodiments, numerous modifications and variations could be made thereto by those skilled in the art without departing from the scope and spirit of this disclosure set forth in the claims.

What is claimed is:

1. A flexible wireless charging mouse pad, comprising:
   an anti-slip cushion layer, comprising a topside and a single-ring groove, wherein the anti-slip cushion layer has a thickness in a longitudinal direction, the single-ring groove is concave on the topside along the longitudinal direction, and an inner bottom groove wall is disposed on a concave end point of the single-ring groove, and the inner bottom groove wall and a bottom surface of the anti-slip cushion layer are located at different planes;
   a double-sided adhesive layer, attached and adhered to the topside; and
   a coil, comprising a plurality of surrounding rings arranged adjacently with each other along a lateral direction, wherein each of the surrounding rings of the coil inside the single-ring groove is stacked and connected between the double-sided adhesive layer and the inner bottom groove wall along the longitudinal direction and is adhered by the double-sided adhesive layer,
   wherein the anti-slip cushion layer is a bottommost layer, the bottom surface of the anti-slip cushion layer is a bottommost side of the flexible wireless charging mouse pad to be an anti-slip pad, and the anti-slip cushion layer is flexible, the thickness of the anti-slip cushion layer is greater than a core diameter of the coil and a topside of each surrounding ring is coplanar with the topside of the anti-slip cushion layer.

2. The flexible wireless charging mouse pad in claim 1, further comprising:

a plastic sheet layer, an underside thereof being stacked and connected with the double-sided adhesive layer along the longitudinal direction.

3. The flexible wireless charging mouse pad in claim 2, wherein the plastic sheet layer is a rubber sheet.

4. The flexible wireless charging mouse pad in claim 2, further comprising: a cloth layer, stacked and connected between the underside of the plastic sheet layer and the double-sided adhesive layer, and the cloth layer being adhered by the double-sided adhesive layer, and the plastic sheet layer and the cloth layer being fixed to each other.

5. The flexible wireless charging mouse pad in claim 4, wherein the cloth layer is a non-woven fabric.

6. The flexible wireless charging mouse pad in claim 2, further comprising: a contact layer, and the plastic sheet layer comprising the underside and a topside opposite to each other, and the contact layer being stacked and connected to the topside of the plastic sheet layer along the longitudinal direction.

7. The flexible wireless charging mouse pad in claim 6, wherein the contact layer is a piece of cloth, a film, or a plastic sheet.

8. The flexible wireless charging mouse pad in claim 1 wherein each of the surrounding rings of the coil is partly coplanar with the topside of the anti-slip cushion layer.

9. The flexible wireless charging mouse pad in claim 1 wherein the anti-slip cushion layer is a rubber anti-slip pad or a silicone anti-slip pad.

* * * * *